United States Patent
Hu et al.

(10) Patent No.: US 7,426,125 B2
(45) Date of Patent: Sep. 16, 2008

(54) ADJUSTABLE COMPACT HIGH-FREQUENCY-HIGH-VOLTAGE POWER SUPPLY

(75) Inventors: Hung-Tsai Hu, Taipei County (TW); Wai-Ting Huang, Taipei County (TW); Yih-Ping Chen, Taoyuan County (TW)

(73) Assignee: Institute of Nuclear Energy Research Atomic Energy Council, Executive Yuan, Taoyuan County (TW)

( * ) Notice: Subject to any disclaimer, the term of this patent is extended or adjusted under 35 U.S.C. 154(b) by 37 days.

(21) Appl. No.: 11/627,114

(22) Filed: Jan. 25, 2007

(65) Prior Publication Data

US 2008/0112202 A1    May 15, 2008

(30) Foreign Application Priority Data

Oct. 31, 2006   (TW) .............................. 95140206 A

(51) Int. Cl.
H02M 7/5387  (2007.01)
H02M 7/53    (2006.01)

(52) U.S. Cl. ...................................... 363/98

(58) Field of Classification Search .................. 363/55, 363/56.02, 95, 98, 131, 132
See application file for complete search history.

(56) References Cited

U.S. PATENT DOCUMENTS

| | | | |
|---|---|---|---|
| 4,281,374 A | | 7/1981 | Archer |
| 4,860,189 A | * | 8/1989 | Hitchcock .................... 363/132 |
| 4,916,599 A | * | 4/1990 | Traxler et al. .................. 363/65 |
| 5,483,436 A | * | 1/1996 | Brown et al. ................... 363/98 |
| 5,528,485 A | | 6/1996 | Devilbiss et al. |
| 5,864,225 A | | 1/1999 | Bryson |
| 5,959,856 A | * | 9/1999 | Sturgeon ...................... 363/98 |
| RE38,140 E | | 6/2003 | Schaffer |
| 6,650,558 B1 | * | 11/2003 | Pacala et al. ................. 363/132 |
| 6,819,061 B2 | | 11/2004 | Danjo et al. |
| 6,891,336 B1 | | 5/2005 | Mita |
| 6,936,974 B2 | | 8/2005 | Melis |
| 7,099,169 B2 | * | 8/2006 | West et al. ................... 363/132 |
| 7,102,898 B2 | * | 9/2006 | Brkovic ........................ 363/19 |
| 7,132,802 B2 | * | 11/2006 | Fischer et al. ................ 315/224 |

* cited by examiner

*Primary Examiner*—Gary L Laxton
(74) *Attorney, Agent, or Firm*—WPAT., P.C.; Justin King

(57) ABSTRACT

An adjustable compact high-frequency-high-voltage power supply utilizes an inverter to convert DC power to AC power so as to provide high frequency AC power at high voltages in a DC environment. Furthermore, the output voltage and frequency can be adjusted through adjustments of variable resistors during operation so as to provide high-frequency-high-voltage AC power at different frequencies and voltages.

10 Claims, 3 Drawing Sheets

ADJUSTABLE COMPACT HIGH-FREQUENCY-HIGH-VOLTAGE POWER SUPPLY

BACKGROUND OF THE INVENTION

1. Field of the Invention

The present invention generally relates to an adjustable compact high-frequency-high-voltage power supply and, more particularly, to a compact high-frequency-high-voltage power supply utilizing an inverter to convert low-voltage DC power to high-voltage-high-frequency AC power and provide high-frequency-high-voltage AC power at different frequencies and voltages via continuous adjustment of variable resistors during operation.

2. Description of the Prior Art

Inverters are widely used in switching power supplies and inverter motor controllers. The operation frequency of the former is limited within a smaller range because the objective of the former is to provide a stable power to a load. The operation frequency of the latter has to be changed smoothly by using complicated control circuitry so as to change the rotating speed and torque for matching the operation condition and load.

U.S. Pat. No. 4,281,374 discloses a circuit that can output high-voltage AC power so as to convert DC power to an adjustable and waveform-controllable high-voltage AC power using pulse-width modulation (PWM) according to a 600-Hz waveform generator producing a high-frequency waveform and measuring the output AC voltage for feedback control. U.S. Pat. No. 4,281,374 teaches the cutting frequency for PWM generated by a high-frequency oscillator at least ten times the frequency of output AC power. However, the "374" patent does not disclose how to change the cutting frequency for PWM.

U.S. Pat. No. 6,819,061 discloses a power supply apparatus for light source in which AC power is rectified to DC power, converted to high-frequency AC power by use of a DC inverter and then rectified to output DC power. It depends on the comparison between the actual output DC power and a reference power value for keeping a stable output DC power. Moreover, the output DC power is controlled according to the supplied AC voltage so as to prevent over-current due to voltage drop. However, the "061" patent does not teach how to change the frequency of the DC inverter.

U.S. Pat. No. 6,891,336 discloses a high-pressure discharge lamp lighting apparatus and luminaire using thereof in which a DC power operates within a pre-set frequency range such as 0~20 KHz, 40~50 KHz and 80~88 KHz in order to prevent the high-pressure discharge lamp from being damaged due to resonance. In U.S. Pat. No. 6,891,336, a half-bridge inverter is used with an inductor and a capacitor to provide the high-frequency AC power to the high-pressure discharge lamp and a timing controller is used to control the pre-determined operation time in different frequency ranges in order to stabilize the output power and shorten the turn-on time. However, the "336" patent does not teach how to adjust both the frequency of the DC inverter and timing control in a continuous range.

U.S. Pat. No. 6,936,974 discloses a half-bridge inverter for asymmetrical loads that uses an operational amplifier to perform voltage control according to the reference voltage, the feedback voltage and the pre-determined upper and lower voltage limits and timing control according to the reference voltage, the feedback voltage and a pre-determined value so as to obtain a stable output power within a pre-determined range of supplied voltage and achieve over-current protection. However, the "974" patent does not teach how to adjust the frequency of the DC inverter and timing control in a continuous range externally.

Therefore, there exists a need for providing an adjustable and compact high-frequency-high-voltage power supply capable of outputting a high-frequency-high-voltage AC power at different frequencies and voltages according to different loads using external adjustments.

SUMMARY OF THE INVENTION

The primary object of the present invention is to provide an adjustable compact high-frequency-high-voltage power supply that utilizes an inverter to convert low-voltage DC power to high-voltage-high-frequency AC power with external adjustments of variable resistors so as to adjust timing parameter, output voltage, and operation frequency during operation. The power supply automatically provides high-frequency-high-voltage AC power at different voltages according to the setting of timing parameter during startup and the frequencies and voltages of high-frequency-high-voltage AC power are adjustable anytime during operation based on the requirements of different applications.

The secondary object of the present invention is to provide an adjustable compact high-frequency-high-voltage power supply that utilizes an inverter to convert low-voltage DC power to high-voltage-high-frequency AC power so as to provide high-frequency-high-voltage AC power at different voltages automatically according to a fixed timing parameter and the frequency and voltage of the high-voltage-high-frequency AC power are adjustable during operation based on the requirement of a specific application.

In order to achieve the foregoing objects, the present invention provides an adjustable compact high-frequency-high-voltage power supply comprising: a voltage control circuit for receiving a DC voltage from a power supply unit and converting the DC voltage to a first and second voltage level by a first and second variable resistors for voltage adjustment so as to output the first or second voltage level to an inverter having set of full-bridge field-effect transistors according to an adjustable timing control signal from a timing control circuit having a transistor controlled by a capacitor, a diode and a variable resistor; a pulse-width modulation (PWM) circuit using a third variable resistor for frequency adjustment to generate a frequency control signal to be output to a coupling transformer of the inverter; wherein the inverter generates a first or a second voltage pulse according to the frequency set by the frequency control signal and the first or the second voltage level and outputs the first or second voltage pulse to a step-up high-frequency-high-voltage transformer in order to provide a corresponding high-frequency-high-voltage AC power.

Furthermore, the present invention provides an adjustable compact high-frequency-high-voltage power supply comprising: a voltage control circuit for receiving a DC voltage from a power supply unit and converting the DC voltage to a fixed first and the second voltage level by a resistor and a first variable resistors for voltage adjustment so as to output the fixed first or the second voltage level to an inverter having set of full-bridge field-effect transistors according to a fixed timing control signal from a timing control circuit having a transistor controlled by a capacitor, a diode and a resistor; a pulse-width modulation (PWM) circuit using a second variable resistor for frequency adjustment to generate a frequency control signal to be output to a coupling transformer of the inverter; wherein the inverter generates a first or a second voltage pulse according to the frequency set by the frequency control signal and the first or the second voltage level and outputs the first or second voltage pulse to a step-up high-frequency-high-voltage transformer in order to provide a corresponding high-frequency-high-voltage AC power.

Preferably, the adjustable compact high-frequency-high-voltage power supply further comprises an over-current protection unit electrically coupled between the power supply unit and the voltage control circuit and the over-current protection unit can be a fuse or a breaker.

Preferably, the power supply unit is a battery.

Preferably, the voltage control circuit comprises an inductor for over-current protection.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention providing an adjustable compact high-frequency-high-voltage power supply can be exemplified by the preferred embodiments as described hereinafter.

Figure 1:
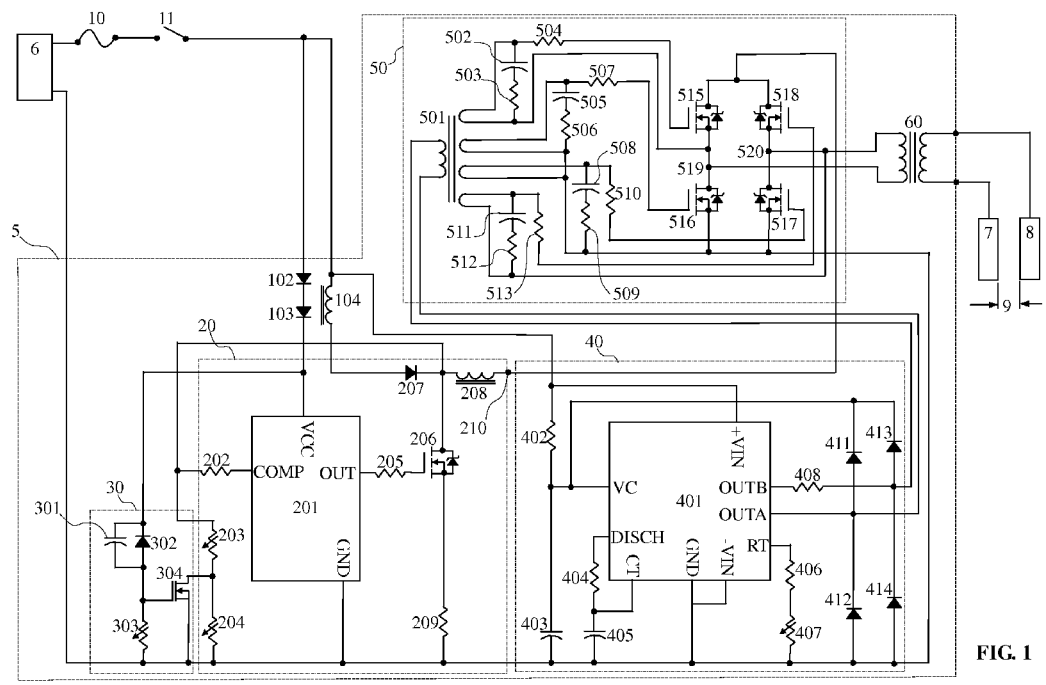
FIG. 1 is a circuit diagram according to a first embodiment of the present invention.

Please refer to FIG. 1, a circuit diagram according to a first embodiment of the present invention. The adjustable compact high-frequency-high-voltage power supply 5 of the present invention comprises a voltage control circuit 20, a timing control circuit 30, a pulse-width modulation (PWM) circuit 40, an inverter 50 and a high-frequency-high-voltage transformer 60. The output terminal of the adjustable compact high-frequency-high-voltage power supply 5 is connected to a pair of electrodes 7 and 8 with a discharge gap 9. The adjustable compact high-frequency-high-voltage power supply 5 further comprises a power supply unit 6, an over-current protection unit 10 and a switch 11.

The voltage control circuit 20 has a boost circuit including an inverter control chip 201, a gate resistor 205, a field-effect transistor 206, a diode 207, an inductor 208, and a resistor 209. The voltage of the output terminal 210 is higher than an input voltage of the diode 207 where the input voltage is the DC voltage supplied from the power supply unit 6. The voltage of the output terminal 210 is determined according to a feedback voltage at a COMP port of the inverter control chip 201. The feedback voltage is obtained between the diode 207 and the inductor 208 by a feedback loop composed of a feedback resistor 202, a first variable resistor 203 and a second variable resistor 204. It is noted that the higher the feedback voltage, the higher the voltage at the output terminal 210 and, on the contrary, the lower the feedback voltage, the lower the voltage at the output terminal 210.

It is also noted that the inverter control chip 201 of the present embodiment is exemplified by chip code UC3843 but the present invention is not limited thereto and any chip with the same or similar function can be used in the present invention.

When the switch 11 is closed to supply a DC voltage from the power supply unit 6 (such as a battery or other DC power source), a capacitor 301 and a diode 302 of the timing control circuit 30 are arranged so that the capacitor 301 is short-circuit at this instance so as to close the base-source junction of the transistor 304. Meanwhile, a first feedback voltage (not shown) resulted by the resistor 202 and the first variable resistor 203 of the voltage control circuit 20 is input to the COMP port of the inverter control chip 201. The inverter control chip 201 controls the switching of the field-effect transistor 206 according to the first feedback voltage so that a first voltage level is generated at the output terminal 210 due to the field-effect transistor 206, the diode 207 and the inductor 208.

After a period of startup time, the capacitor 301 of the timing control circuit 30 is open-circuit because of saturation so that the base-source junction of the transistor 304 becomes open. Meanwhile, a second feedback voltage (not shown) resulted by the resistor 202, the first variable resistor 203 and the second variable resistor 204 in serial of the voltage control circuit 20 is input to the COMP port of the inverter control chip 201. The inverter control chip 201 controls the switching of the field-effect transistor 206 according to the second feedback voltage so that a second voltage level is generated at the output terminal 210 due to the field-effect transistor 206, the diode 207 and the inductor 208.

The first voltage level is determined by the resistor 202 along with the first variable resistor 203 and the second voltage level is determined by the resistor 202 along with the first variable resistor 203 and the second variable resistor 204 in serial. Since the resistance of the first variable resistor 203 is smaller than the resistance of the first variable resistor 203 and the second variable resistor 204 in serial, the first voltage level is higher than the second voltage level.

It is noted that the first voltage level can be adjusted by adjusting the resistance of the first variable resistor 203 and the second voltage level can be adjusted by adjusting the resistance value of the second variable resistor 204.

It is also noted that the current flowing through the capacitor 301 can be adjusted by adjusting a variable resistor 303 of the timing control circuit 30. It indicates that the time for the first voltage level at the output terminal 210 can be adjusted by adjusting the saturation time for the capacitor 301.

Referring to FIG. 1, the first voltage level and the second voltage level are provided to two source electrodes (515 and 518) of the set of full-bridge field-effect transistors 515~518 of the inverter 50. The negative electrode of the power supply unit 6 is connected to the other two source electrodes (516 and 517) of the set of full-bridge field-effect transistors 515~518. In this manner, the first voltage level and the second voltage level provide the bias voltage for the inverter 50.

The pulse-width modulation (PWM) circuit 40 includes a PWM driver chip 401, a first resistor 402, a first capacitor 403, a second resistor 404, a second capacitor 405, a third resistor 406, a third variable resistor 407, a fourth resistor 408 and four diodes 411~414. The second resistor 404, the second capacitor 405, the third resistor 406 and the third variable resistor 407 construct a frequency modulation circuit for the PWM driver chip 401. A frequency control signal (not shown) output by the PWM driver chip 401 can be adjusted by adjusting the resistance of the third variable resistor 407 and the frequency control signal is provided to a coupling transformer 501 of the inverter 50.

It is noted that the PWM driver chip 401 of the present embodiment is exemplified by chip code UC3525 but the present invention is not limited thereto and any chip with the same or similar function can be used in the present invention.

Moreover, the first resistor 402 and a first capacitor 403 are required to provide the bias voltage for the PWM driver chip 401 and the fourth resistor 408 and four diodes 411~414 are required as the output circuit of the PWM driver chip 401. However, such circuitry for the PWM driver chip 401 is known to whom have ordinary skills in the art and thus the description thereof is omitted.

The coupling transformer 501 of the inverter 50 receives the frequency control signal from the PWM circuit 40 and activates a pair of field-effect transistors (515 and 517 or 516 and 518) of the full bridge field-effect transistors according to the phase arrangement of the winding. Thus a high-frequency-low-voltage AC voltage is produced between a first output terminal 519 and a second output terminal 520 according to the first and second voltage levels and hence the high-frequency-low-voltage AC voltage is output to the high-frequency-high-voltage transformer 60. The detailed description for the coupling transformer 501 activating a pair of field-effect transistors of the full bridge field-effect transistors according to the phase arrangement of the winding is well known and therefore is omitted.

Moreover, the inverter 50 further includes eight resistors 503, 504, 506, 507, 509, 510, 512, 513 and four capacitors 502, 505, 508, 511 that are used to form circuitry for activating the full-bridge field-effect transistors. However, such circuitry for the inverter 50 is well known to whom have ordinary skills in the art and thus description thereof is omitted.

The high-frequency-high-voltage transformer 60 is a step-up transformer for receiving and converting the high-frequency-low-voltage AC voltage produced between the first output terminal 519 and the second output terminal 520 into a high-frequency-high-voltage AC voltage that is output through a first output port 601 and a second output port 602 to an external load, namely, the electrodes 7 and 8 in FIG. 1. It is noted that the frequency control signal determines the operation frequency of the high-frequency-high-voltage AC voltage.

Figure 2:
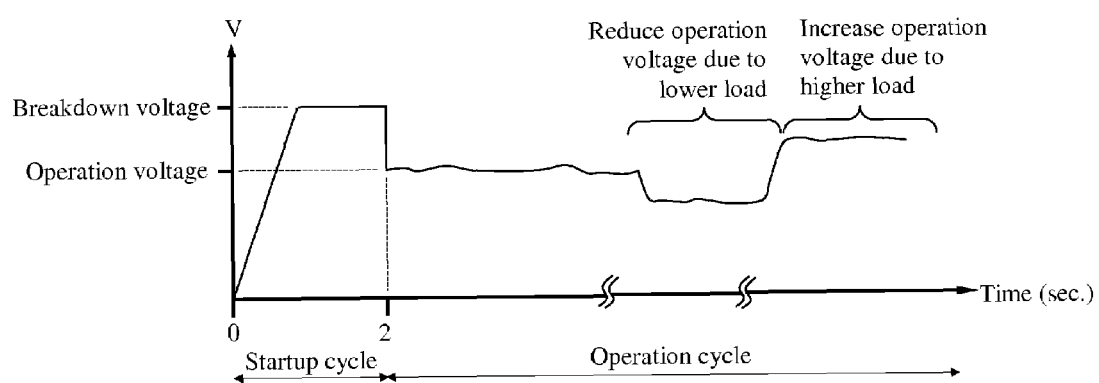
FIG. 2 shows discharge characteristics according to the first embodiment of the present invention.

Please refer to FIG. 2, which shows the discharge characteristics according to a first embodiment of the present invention. It is to note that the startup cycle can be varied as required according to the discharge characteristics of an application and is not limited to two seconds as shown in FIG. 2. The application can be a high-pressure or atmospheric pressure discharge lamp device or non-thermal plasma discharge device. Moreover, the first variable resistor can be adjusted at any time during the startup cycle so as to adjust the first voltage level for the adjustment of a breakdown voltage level in order to fulfill the discharge characteristics of a device. The second variable resistor can be adjusted at any time during the operation cycle so as to adjust the second voltage level for the adjustment of an operation voltage level in order to fulfill the load conditions of the device. Furthermore, during the startup and operation cycles, the third variable resistor can be adjusted at any time so as to adjust the frequency control signal for the adjustment of the high-frequency-high-voltage AC voltage in order to fulfill both the discharge characteristics and load conditions of the device.

An atmospheric pressure non-thermal plasma discharge device is taken for exemplifying the discharge characteristics and load conditions. Referring to FIG. 1, when the voltage applied to the pair of electrodes 7 and 8 exceeds a threshold value, in other words, the voltage overcomes the dielectric strength between the pair of electrodes 7 and 8, an electrical arc is generated within the gap 9 for ionizing the gaseous molecules therein, namely, a discharge is generated between the pair of electrodes 7 and 8. The threshold value is referred as the "breakdown voltage". After the discharge takes place between the pair of electrodes 7 and 8, the dielectric strength is reduced because most of the gaseous molecules have been ionized. Hence, the voltage required for the subsequent discharge is lowered and is now referred as the "operation voltage". Therefore, the breakdown voltage for the startup cycle is higher in order to overcome the dielectric strength between the pair of electrodes 7 and 8 and cause a discharge and afterwards the operation voltage for the operation cycle can be lower in order to remain the continuous discharges. That means the operation voltage can be supplied except the startup cycle in order to reduce the electricity consumption.

It should be noted that the pair of electrodes 7 and 8 can be the electrodes for high-pressure or atmospheric pressure discharge lamp device or non-thermal plasma discharge device and the shape thereof is not limited to the example shown in FIG. 1. Moreover, the gaseous molecules within the gap 9 are not limited to any category. Any use of gaseous molecules for the high-pressure or atmospheric pressure discharge lamp device or non-thermal plasma discharge device is within the scope of the present invention.

Furthermore, the adjustable compact high-frequency-high-voltage power supply 5 includes an inductor 104 electrically connected in between the switch 11 and the diode 207 so as to limit a current surge induced by the discharge and prevent the circuitry from being damaged. Moreover, the adjustable compact high-frequency-high-voltage power supply 5 further includes two diodes 102 and 103 so as to protect the inverter control chip 201. The description related to this portion is known to whom with the ordinary skills in the art and therefore is omitted.

In FIG. 1, an over-current protection unit 10 is serially connected between the power supply unit 6 and the switch 11 so as to limit the current and protect the adjustable compact high-frequency-high-voltage power supply 5. The over-current protection unit 10 can be implemented using a fuse or a circuit breaker. The description related to this portion is known to whom with ordinary skills in the art and thereof is omitted.

Accordingly, the present invention uses an inverter to provide the high-frequency-high-voltage AC power in a DC environment. The output voltage and frequency of the high-frequency-high-voltage AC power can be adjusted through adjustments of variable resistors during or prior to operation so as to provide the high-frequency-high-voltage AC power at different frequencies and voltages in order to fulfill the conditions of different loads. Furthermore, the values of the electrical parameters such as voltage, current and frequency can be displayed on a display unit after adjusting the variable resistors for the observation of user. The description related to this portion is known to whom with ordinary skills in the art and thereof is omitted. It is noted that the variable resistors are provided with calibrations as the indication of adjustment and thus the electrical parameters corresponding to the specific adjustments can be recorded for an application. Afterwards, the variable resistors can be adjusted according to the recorded data without the display of the electrical parameters.

Figure 3:
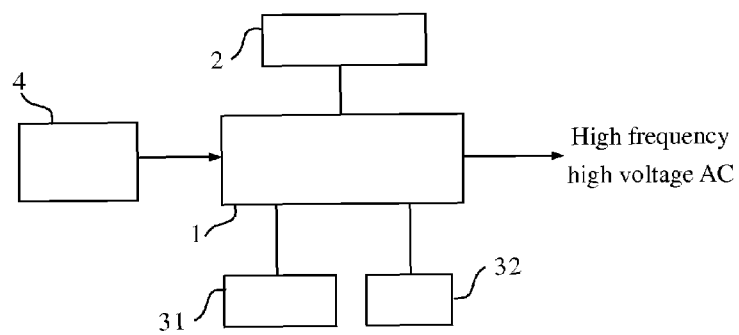
FIG. 3 is a conventional adjustable high-frequency-high-voltage power supply with peripherals connected thereto.

Please refer to FIG. 3, which is a conventional adjustable high-frequency-high-voltage power supply (for example, Trek Model 30/20) with peripherals connected thereto. The conventional adjustable high-frequency-high-voltage power supply 1 is powered by the 110 V AC utility power 4 and is connected with a waveform generator 2 for providing a waveform with a specific frequency so as to drive the adjustable high-frequency-high-voltage power supply 1 for outputting the required high-frequency-high-voltage AC power. In addition an oscilloscope 31 and an electrical meter 32 are required to monitor the related parameters for adjustments.

Accordingly, the conventional adjustable high-frequency-high-voltage power supply 1 has to be equipped with a number of peripherals connected thereto and uses 110 V AC power that limits its applications such as that onboard a vehicle. As a result of comparison, the adjustable compact high-frequency-high-voltage power supply of the present invention is advantageous over the conventional one in cost, size and applications because the former does not requires an additional waveform generator and other peripherals and the output voltages and frequencies can be adjusted according to various load conditions.

Figure 4:
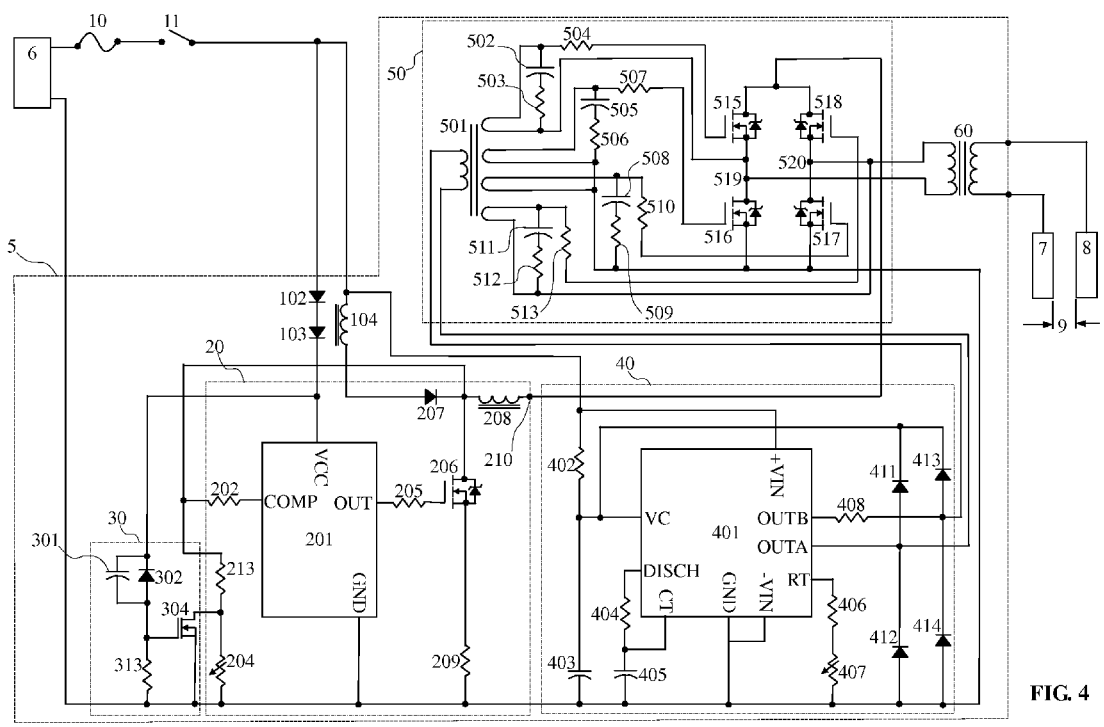
FIG. 4 is a circuit diagram according to a second embodiment of the present invention.

Please refer to FIG. 4, which is a circuit diagram according to a second embodiment of the present invention. The adjustable compact high-frequency-high-voltage power supply 5 of the present invention includes a voltage control circuit 20, a timing control circuit 30, a pulse-width modulation (PWM) circuit 40, an inverter 50 and a high-frequency-high-voltage transformer 60. The output terminal of the adjustable compact high-frequency-high-voltage power supply 5 is connected to a pair of electrodes 7 and 8 with a discharge gap 9. A power supply unit 6, an over-current protection unit 10 and a switch 11 are also shown in FIG. 4.

When the adjustable compact high-frequency-high-voltage power supply 5 is equipped with a specific device with fixed discharge characteristics, the timing control circuit 30 does not require the variable resistor 303 for adjusting the time for closing base-source junction of the transistor 304 but a fixed resistor 313. In this case, the startup cycle controlled by the timing control circuit 30 is a fixed period of time and only the discharge characteristics of the specific device need to be considered. The rest regarding this portion is the same as the first embodiment and therefore is omitted.

Moreover, the voltage control circuit 20 does not require the first variable resistor 203 but a fixed resistor 213 since the first voltage level output from the voltage control circuit 20 is fixed that only has to fulfill the discharge characteristics of the specific device. Nevertheless, the voltage control circuit 20 still has the second variable resistor 204 so as to adjust the second voltage level in order to fulfill various load conditions. The rest regarding this portion is the same as the first embodiment and therefore is omitted.

Furthermore, the pulse-width modulation (PWM) circuit 40 still has the third variable resistor 407 so as to adjust the frequency control signal for various load conditions. The rest regarding this portion is the same as the first embodiment and therefore is omitted.

As a result, the adjustable compact high-frequency-high-voltage power supply 5 of the present invention is simplified for a specific device so as to further reduce cost and space as well as to simplify the operation while remaining the automatic switch of voltage level during the startup cycle. Moreover, the operation voltage level and frequency of the output high-frequency-high-voltage AC power can be adjusted at any time during operation in order to fulfill the load conditions of the specific device.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. An adjustable compact high-frequency-high-voltage power supply, comprising:

a timing control circuit, including at least a first capacitor, a fourth variable resistor, a fourth transistor and a first diode;

a voltage control circuit, including at least an inverter control chip, a first variable resistor, a second variable resistor, a first field-effect transistor, a second diode and a first inductor;

a pulse-width modulation (PWM) circuit, including at least a PWM driver chip, a third variable resistor, a first resistor, a second resistor and a second capacitor;

an inverter, including at least a coupling transformer and a second full-bridge field-effect transistor and a third full-bridge field-effect transistor; and a high-frequency-high-voltage transformer;

wherein a setting resistance of the fourth variable resistor along with the first capacitor and the first diode of said timing control circuit control the first field-effect transistor to generate a timing control signal when said timing control circuit receives a DC voltage from a power supply unit;

wherein the timing control signal varies according to a first setting resistance of the fourth variable resistor so as to control the inverter control chip of said voltage control circuit for activating the first field-effect transistor to generate a first voltage level and a second voltage level at an output terminal of the first inductor according to a second setting resistance of the first variable resistor or both setting resistances of the first variable resistor and the second variable resistor respectively, and output the first voltage level and the second voltage level to two source electrodes of the second full-bridge field-effect transistor and the third full-bridge field-effect transistor of said inverter, wherein the first voltage level and the second voltage level are adjustable by continuously adjusting the first variable resistor and the second variable resistor during operation;

wherein said PWM circuit generates a frequency control signal that is output to the coupling transformer of said inverter according to a fifth setting resistance of the third variable resistor, wherein the frequency control signal is adjustable by continuously adjusting the third variable resistor during operation;

wherein the coupling transformer of said inverter turns on the second full-bridge field-effect transistor and the third full-bridge field-effect transistor according to the frequency control signal so that the second full-bridge field-effect transistor and the third full-bridge field-effect transistor generate a first voltage pulse or a second voltage pulse according to the first voltage level or the second voltage level respectively, wherein the first voltage pulse or the second voltage pulse is output to said high-frequency-high-voltage transformer to generate corresponding high-frequency-high-voltage AC power.

2. The adjustable compact high-frequency-high-voltage power supply of claim 1 further comprises a fuse electrically connected in between the power supply unit and said voltage control circuit for over-current protection.

3. The adjustable compact high-frequency-high-voltage power supply of claim 1 further comprises a circuit breaker electrically connected in between the power supply unit and said voltage control circuit for over-current protection.

4. The adjustable compact high-frequency-high-voltage power supply of in claim 1 further comprises a second inductor electrically connected in between the power supply unit and the diode of said voltage control circuit for over-current protection.

5. The adjustable compact high-frequency-high-voltage power supply of claim 1, wherein the power supply unit is a battery.

6. An adjustable compact high-frequency-high-voltage power supply, comprising:
- a timing control circuit, including at least a first capacitor, a fixed resistor, a first transistor and a first diode;
- a voltage control circuit, including at least an inverter control chip, a third resistor, a first variable resistor, a second field-effect transistor, a second diode and a first inductor;
- a pulse-width modulation (PWM) circuit, including at least a PWM driver chip, a second variable resistor, a first resistor, a second resistor and a second capacitor;
- an inverter, including at least a coupling transformer and a third full-bridge field-effect transistor and a fourth full-bridge field-effect transistor; and
- a high-frequency-high-voltage transformer;
- wherein a resistance of the fixed resistor along with the first capacitor and the first diode of said timing control circuit controls the first transistor to generate a fixed timing control signal when said timing control circuit receives a DC voltage from a power supply unit so as to control the inverter control chip of said voltage control circuit for activating the second field-effect transistor to generate a fixed first voltage level and a second voltage level at an output terminal of the first inductor according to a first resistance of the third resistor or both sixth and seventh setting resistances of the third resistor and the first variable resistor respectively and output the fixed first voltage level and the second voltage level to two source electrodes of the third full-bridge field-effect transistor and the fourth full-bridge field-effect transistor of said inverter, wherein the second voltage level is adjustable by continuously adjusting the first variable resistor during operation;
- wherein said PWM circuit generates a frequency control signal that is output to the coupling transformer of said inverter according to a second setting resistance of the second variable resistor, wherein the frequency control signal is adjustable by continuously adjusting the second variable resistor during operation;
- wherein the coupling transformer of the inverter turns on the third full-bridge field-effect transistor and the fourth full-bridge field-effect transistor according to the frequency control signal so that the third full-bridge field-effect transistor and the fourth full-bridge field-effect transistor generate a first voltage pulse or a second voltage pulse according to the fixed first voltage level or the second voltage level, wherein the first voltage pulse or the second voltage pulse is output to the high-frequency-high-voltage transformer to generate corresponding high-frequency-high-voltage AC power.

7. The adjustable compact high-frequency-high-voltage power supply of claim 6 further comprises a fuse electrically connected in between the power supply unit and said voltage control circuit for over-current protection.

8. The adjustable compact high-frequency-high-voltage power supply of claim 6 further comprises a circuit breaker electrically connected in between the power supply unit and said voltage control circuit for over-current protection.

9. The adjustable compact high-frequency-high-voltage power supply of claim 6 further comprises a second inductor electrically connected in between the power supply unit and the diode of said voltage control circuit for over-current protection.

10. The adjustable compact high-frequency-high-voltage power supply of claim 6, wherein the power supply unit is a battery.

* * * * *